(12) United States Patent
Bowers et al.

(10) Patent No.: US 7,266,839 B2
(45) Date of Patent: Sep. 4, 2007

(54) SYSTEM AND METHOD FOR PROVIDING DISCRIMINATED CONTENT TO NETWORK USERS

(76) Inventors: Theodore J. Bowers, 17 Solitude Way, Wilmington, DE (US) 19808; Dean Ilijasic, 5907 Valley Way, Wilmington, DE (US) 19807; Shelley F. Sanders, 215 Fern Ridge, Landenberg, PA (US) 19350

( * ) Notice: Subject to any disclaimer, the term of this patent is extended or adjusted under 35 U.S.C. 154(b) by 755 days.

(21) Appl. No.: 09/902,612

(22) Filed: Jul. 12, 2001

(65) Prior Publication Data

US 2003/0014519 A1 Jan. 16, 2003

(51) Int. Cl.
G06F 7/04 (2006.01)
G06F 17/30 (2006.01)
H04L 9/32 (2006.01)

(52) U.S. Cl. .......................................... 726/8; 709/229
(58) Field of Classification Search ........ 713/155–156, 713/182, 200–202; 705/53, 77–78, 14; 709/223–229; 726/8
See application file for complete search history.

(56) References Cited

U.S. PATENT DOCUMENTS

| | | |
|---|---|---|
| 3,896,266 A | 7/1975 | Waterbury |
| 3,938,091 A | 2/1976 | Liu et al. |
| 4,321,672 A | 3/1982 | Thomson et al. |
| 4,567,359 A | 1/1986 | Lockwood |
| 4,633,397 A | 12/1986 | Macco |
| 4,695,880 A | 9/1987 | Johnson |
| 4,696,491 A | 9/1987 | Stenger |
| 4,713,761 A | 12/1987 | Sharpe |
| 4,725,719 A | 2/1988 | Roach et al. |
| 4,745,468 A | 5/1988 | Von Kohorn |
| 4,799,156 A | 1/1989 | Shavit et al. |
| 4,801,787 A | 1/1989 | Suzuki |
| 4,823,264 A | 4/1989 | Deming |
| 4,882,675 A | 11/1989 | Nichtberger |
| 4,926,255 A | 5/1990 | Von Kohorn |

(Continued)

FOREIGN PATENT DOCUMENTS

DE 19731293 1/1999

(Continued)

OTHER PUBLICATIONS

Carden, Mar. 22, 1999, Network Computing, p. 1-4.*

(Continued)

*Primary Examiner*—Emmanuel L. Moise
*Assistant Examiner*—Michael Pyzocha

(57) ABSTRACT

The present invention provides methods and systems for providing discriminated partner system resources to the user of a host system. A host entity has a business relationship with one or more partnered entities. A user accesses the host's system and then uses the host's system to connect to a partner's system. Access from one system to the next is seamless and requires no additional user input to verify the user's access rights to subsequently accessed partners' systems. The content delivered to the user from a partner's system is discriminated from a larger pool of information to appear consistent in appearance, message, or both with the host system. The host system, the partner system or both systems may perform the discrimination functions. The user is thereby provided with seamless access to partnered systems that reflects the business partnership of the host and various partners.

24 Claims, 4 Drawing Sheets

U.S. PATENT DOCUMENTS

| | | |
|---|---|---|
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,157,717 A | 10/1992 | Hitchcock |
| 5,189,606 A | 2/1993 | Burns et al. |
| 5,220,501 A | 6/1993 | Lawlor |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,317,683 A | 5/1994 | Hager |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,424,938 A | 6/1995 | Wagner |
| 5,446,740 A | 8/1995 | Yien |
| 5,450,134 A | 9/1995 | Legate |
| 5,450,537 A | 9/1995 | Hirai |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Chang |
| 5,485,370 A | 1/1996 | Naylor et al. |
| 5,511,117 A | 4/1996 | Zazzera |
| 5,532,920 A | 7/1996 | Hartrick |
| 5,534,855 A | 7/1996 | Shockley et al. |
| 5,537,314 A | 7/1996 | Kanter |
| 5,537,437 A | 7/1996 | Kaku |
| 5,544,086 A | 8/1996 | Davis |
| 5,551,021 A | 8/1996 | Harada et al. |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,560 A | 1/1997 | Deaton |
| 5,594,837 A | 1/1997 | Noyes |
| 5,598,557 A | 1/1997 | Doner |
| 5,602,936 A | 2/1997 | Green et al. |
| 5,603,025 A | 2/1997 | Tabb |
| 5,604,490 A | 2/1997 | Blakley, III et al. |
| 5,606,496 A | 2/1997 | D'Agostino |
| 5,621,201 A | 4/1997 | Langhans |
| 5,621,789 A | 4/1997 | McCalmont |
| 5,621,812 A | 4/1997 | Deaton |
| 5,625,767 A | 4/1997 | Bartell |
| 5,634,101 A | 5/1997 | Blau |
| 5,638,457 A | 6/1997 | Deaton |
| 5,640,577 A | 6/1997 | Scharmer |
| 5,642,419 A | 6/1997 | Rosen |
| 5,644,493 A | 7/1997 | Motai |
| 5,652,786 A | 7/1997 | Rogers |
| 5,653,914 A | 8/1997 | Gruener et al. |
| 5,655,077 A | 8/1997 | Jones et al. |
| 5,657,383 A | 8/1997 | Gerber |
| 5,659,165 A | 8/1997 | Jennings |
| 5,664,115 A | 9/1997 | Fraser |
| 5,666,493 A | 9/1997 | Wojcik et al. |
| 5,671,285 A | 9/1997 | Newman |
| 5,671,354 A | 9/1997 | Ito et al. |
| 5,675,637 A | 10/1997 | Szlam et al. |
| 5,675,662 A | 10/1997 | Deaton |
| 5,678,046 A | 10/1997 | Cahill et al. |
| 5,682,478 A | 10/1997 | Watson et al. |
| 5,682,524 A | 10/1997 | Freund |
| 5,684,870 A | 11/1997 | Maloney |
| 5,684,950 A | 11/1997 | Dare et al. |
| 5,689,100 A | 11/1997 | Carrithers et al. |
| 5,689,638 A | 11/1997 | Sadovsky |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Pinard et al. |
| 5,761,647 A | 6/1998 | Boushy |
| 5,761,661 A | 6/1998 | Coussens |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schneier et al. |
| 5,774,122 A | 6/1998 | Kojima |
| 5,774,551 A | 6/1998 | Wu et al. |
| 5,778,178 A | 7/1998 | Arunachalam |
| 5,784,562 A | 7/1998 | Diener |
| 5,787,403 A | 7/1998 | Randle |
| 5,790,650 A | 8/1998 | Dunn |
| 5,790,785 A | 8/1998 | Klug |
| 5,793,861 A | 8/1998 | Haigh |
| 5,794,178 A | 8/1998 | Caid et al. |
| 5,794,207 A | 8/1998 | Walker |
| 5,794,221 A | 8/1998 | Egendorf |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams |
| 5,815,665 A | 9/1998 | Teper et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,460 A | 11/1998 | Bednar et al. |
| 5,832,476 A | 11/1998 | Tada |
| 5,835,087 A | 11/1998 | Herz |
| 5,835,580 A | 11/1998 | Fraser |
| 5,835,603 A | 11/1998 | Coutts |

| | | | | | |
|---|---|---|---|---|---|
| 5,838,906 A | 11/1998 | Doyle | 5,966,695 A | 10/1999 | Melchione et al. |
| 5,842,178 A | 11/1998 | Giovannoli | 5,966,699 A | 10/1999 | Zandi |
| 5,842,211 A | 11/1998 | Horadan | 5,967,896 A | 10/1999 | Jorasch et al. |
| 5,844,553 A | 12/1998 | Hao | 5,969,318 A | 10/1999 | Mackenthun |
| 5,845,259 A | 12/1998 | West | 5,970,143 A | 10/1999 | Schneier et al. |
| 5,845,260 A | 12/1998 | Nakano | 5,970,470 A | 10/1999 | Walker et al. |
| 5,847,709 A | 12/1998 | Card | 5,970,478 A | 10/1999 | Walker et al. |
| 5,848,143 A | 12/1998 | Andrews | 5,970,482 A | 10/1999 | Pham |
| 5,848,400 A | 12/1998 | Chan | 5,970,483 A | 10/1999 | Evans |
| 5,848,427 A | 12/1998 | Hyodo | 5,978,467 A | 11/1999 | Walker et al. |
| 5,852,812 A | 12/1998 | Reeder | 5,982,370 A | 11/1999 | Kamper |
| 5,857,079 A | 1/1999 | Claus et al. | 5,983,196 A | 11/1999 | Wendkos |
| 5,862,223 A | 1/1999 | Walker | 5,987,434 A | 11/1999 | Libman |
| 5,864,830 A | 1/1999 | Armetta et al. | 5,987,498 A | 11/1999 | Athing et al. |
| RE36,116 E | 2/1999 | McCarthy | 5,991,736 A | 11/1999 | Ferguson et al. |
| 5,870,456 A | 2/1999 | Rogers | 5,991,738 A | 11/1999 | Ogram |
| 5,870,718 A | 2/1999 | Spector | 5,991,740 A * | 11/1999 | Messer ................ 705/27 |
| 5,870,724 A | 2/1999 | Lawlor | 5,991,751 A | 11/1999 | Rivette |
| 5,870,725 A | 2/1999 | Bellinger et al. | 5,991,780 A | 11/1999 | Rivette |
| 5,871,398 A | 2/1999 | Schneier et al. | 5,995,948 A | 11/1999 | Whitford |
| 5,873,072 A | 2/1999 | Kight | 5,995,976 A | 11/1999 | Walker et al. |
| 5,873,096 A | 2/1999 | Lim | 5,999,596 A | 12/1999 | Walker et al. |
| 5,880,769 A | 3/1999 | Nemirofsky et al. | 5,999,907 A | 12/1999 | Donner |
| 5,883,810 A | 3/1999 | Franklin et al. | 6,000,033 A | 12/1999 | Kelly et al. |
| 5,884,032 A | 3/1999 | Bateman | 6,001,016 A | 12/1999 | Walker et al. |
| 5,884,270 A | 3/1999 | Walker et al. | 6,003,762 A | 12/1999 | Hayashida |
| 5,884,272 A | 3/1999 | Walker et al. | 6,005,939 A | 12/1999 | Fortenberry |
| 5,884,274 A | 3/1999 | Walker et al. | 6,006,205 A | 12/1999 | Loeb et al. |
| 5,884,288 A | 3/1999 | Chang | 6,006,249 A | 12/1999 | Leong |
| 5,889,863 A | 3/1999 | Weber | 6,009,442 A | 12/1999 | Chen et al. |
| 5,892,900 A | 4/1999 | Ginter | 6,010,404 A | 1/2000 | Walker et al. |
| 5,898,780 A | 4/1999 | Liu | 6,012,088 A | 1/2000 | Li |
| 5,899,982 A | 5/1999 | Randle | 6,012,983 A | 1/2000 | Walker et al. |
| 5,903,881 A | 5/1999 | Schrader | 6,014,439 A | 1/2000 | Walker et al. |
| 5,909,486 A | 6/1999 | Walker et al. | 6,014,635 A | 1/2000 | Harris et al. |
| 5,910,988 A | 6/1999 | Ballard | 6,014,636 A | 1/2000 | Reeder |
| 5,913,202 A | 6/1999 | Motoyama | 6,014,638 A | 1/2000 | Burge |
| 5,914,472 A | 6/1999 | Foladare | 6,014,641 A | 1/2000 | Loeb et al. |
| 5,915,244 A | 6/1999 | Jack | 6,016,810 A | 1/2000 | Ravenscroft |
| 5,918,214 A | 6/1999 | Perkowski | 6,018,714 A | 1/2000 | Risen |
| 5,918,217 A | 6/1999 | Maggioncalda | 6,018,718 A | 1/2000 | Walker et al. |
| 5,918,239 A | 6/1999 | Allen et al. | 6,024,640 A | 2/2000 | Walker et al. |
| 5,920,847 A | 7/1999 | Kolling et al. | 6,026,429 A | 2/2000 | Jones |
| 5,921,864 A | 7/1999 | Walker et al. | 6,032,134 A | 2/2000 | Weissman |
| 5,923,763 A | 7/1999 | Walker et al. | 6,032,147 A | 2/2000 | Williams |
| 5,926,796 A | 7/1999 | Walker et al. | 6,038,547 A | 3/2000 | Casto |
| 5,926,812 A | 7/1999 | Hilsenrath | 6,038,552 A | 3/2000 | Fleischl et al. |
| 5,930,764 A | 7/1999 | Melchione | 6,042,006 A | 3/2000 | Van Tilburg et al. |
| 5,933,816 A | 8/1999 | Zeanah | 6,045,039 A | 4/2000 | Stinson et al. |
| 5,933,817 A | 8/1999 | Hucal | 6,049,778 A | 4/2000 | Walker et al. |
| 5,933,823 A | 8/1999 | Cullen | 6,049,835 A | 4/2000 | Gagnon |
| 5,933,827 A | 8/1999 | Cole | 6,055,637 A | 4/2000 | Hudson |
| 5,940,812 A | 8/1999 | Tengel | 6,061,665 A | 5/2000 | Bahreman |
| 5,943,656 A | 8/1999 | Crooks et al. | 6,064,987 A | 5/2000 | Walker |
| 5,944,824 A | 8/1999 | He | 6,065,120 A * | 5/2000 | Laursen et al. ............. 726/5 |
| 5,946,388 A | 8/1999 | Walker et al. | 6,065,675 A | 5/2000 | Teicher |
| 5,947,747 A | 9/1999 | Walker et al. | 6,070,147 A | 5/2000 | Harms et al. |
| 5,949,044 A | 9/1999 | Walker et al. | 6,070,244 A | 5/2000 | Orchier et al. |
| 5,949,875 A | 9/1999 | Walker et al. | 6,073,105 A | 6/2000 | Sutcliffe et al. |
| 5,950,173 A | 9/1999 | Perkowski | 6,073,113 A | 6/2000 | Guinan |
| 5,950,174 A | 9/1999 | Brendzel | 6,075,519 A | 6/2000 | Okatani et al. |
| 5,950,206 A | 9/1999 | Krause | 6,076,072 A | 6/2000 | Libman |
| 5,952,639 A | 9/1999 | Ohki | 6,081,790 A | 6/2000 | Rosen |
| 5,952,641 A | 9/1999 | Korshun | 6,081,810 A | 6/2000 | Rosenzweig |
| 5,953,710 A | 9/1999 | Fleming | 6,085,168 A | 7/2000 | Mori et al. |
| 5,956,695 A | 9/1999 | Carrithers et al. | 6,088,444 A | 7/2000 | Walker et al. |
| 5,958,007 A | 9/1999 | Lee et al. | 6,088,683 A | 7/2000 | Jalili |
| 5,960,411 A | 9/1999 | Hartman | 6,088,700 A | 7/2000 | Larsen |
| 5,961,593 A | 10/1999 | Gabber et al. | 6,091,817 A | 7/2000 | Bertina et al. |
| 5,963,635 A | 10/1999 | Szlam et al. | 6,092,196 A | 7/2000 | Reiche |
| 5,963,925 A | 10/1999 | Kolling et al. | 6,095,412 A | 8/2000 | Bertina et al. |
| 5,963,952 A | 10/1999 | Smith | 6,098,070 A | 8/2000 | Maxwell |
| 5,963,953 A | 10/1999 | Cram | 6,101,486 A | 8/2000 | Roberts et al. |

| | | |
|---|---|---|
| 6,104,716 A | 8/2000 | Crichton et al. |
| 6,105,012 A | 8/2000 | Chang et al. |
| 6,111,858 A | 8/2000 | Greaves et al. |
| 6,112,181 A | 8/2000 | Shear |
| 6,115,040 A | 9/2000 | Bladow et al. |
| 6,115,690 A | 9/2000 | Wong |
| 6,119,093 A | 9/2000 | Walker et al. |
| 6,119,099 A | 9/2000 | Walker et al. |
| 6,128,602 A | 10/2000 | Northington et al. |
| 6,131,810 A | 10/2000 | Weiss |
| 6,134,549 A | 10/2000 | Regnier |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A * | 10/2000 | Tobin .................. 715/513 |
| 6,144,946 A | 11/2000 | Iwamura |
| 6,144,948 A | 11/2000 | Walker |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Pare et al. |
| 6,161,182 A | 12/2000 | Nadooshan |
| 6,170,011 B1 | 1/2001 | Macleod Beck |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,225 B1 | 1/2001 | Hagiuda et al. |
| 6,185,242 B1 | 2/2001 | Arthur |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook |
| 6,202,005 B1 | 3/2001 | Mahaffey |
| 6,202,054 B1 | 3/2001 | Lawlor et al. |
| 6,202,151 B1 | 3/2001 | Musgrave et al. |
| 6,208,978 B1 | 3/2001 | Walker et al. |
| 6,208,984 B1 | 3/2001 | Rosenthal |
| 6,219,706 B1 | 4/2001 | Fan |
| 6,222,914 B1 | 4/2001 | McMullin |
| 6,226,623 B1 | 5/2001 | Schein et al. |
| 6,226,679 B1 | 5/2001 | Gupta |
| 6,227,447 B1 | 5/2001 | Campisano |
| 6,230,148 B1 | 5/2001 | Pare, Jr. et al. |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare, Jr. et al. |
| 6,275,944 B1 | 8/2001 | Kao et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,838 B1 | 11/2001 | Baize |
| 6,327,573 B1 | 12/2001 | Walker et al. |
| 6,327,578 B1 | 12/2001 | Linehan |
| 6,332,134 B1 * | 12/2001 | Foster .................. 705/39 |
| 6,332,192 B1 | 12/2001 | Boroditsky et al. |
| 6,336,104 B1 | 1/2002 | Walker et al. |
| 6,349,242 B2 | 2/2002 | Mahaffey |
| 6,349,336 B1 | 2/2002 | Sit et al. |
| 6,408,389 B2 | 6/2002 | Grawrock et al. |
| 6,418,457 B1 | 7/2002 | Schmidt et al. |
| 6,438,594 B1 | 8/2002 | Bowman-Amuah |
| 6,453,353 B1 | 9/2002 | Win et al. |
| 6,460,141 B1 | 10/2002 | Olden |
| 6,487,538 B1 * | 11/2002 | Gupta et al. .................. 705/14 |
| 6,493,677 B1 | 12/2002 | Von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,510,523 B1 | 1/2003 | Perlman et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar |
| 6,540,608 B2 * | 4/2003 | Howson ................. 463/17 |
| 6,557,039 B1 | 4/2003 | Leong et al. |
| 6,581,040 B1 | 6/2003 | Wright et al. |
| 6,584,508 B1 | 6/2003 | Epstein et al. |
| 6,609,113 B1 | 8/2003 | O'Leary |
| 6,609,125 B1 | 8/2003 | Layne et al. |
| 6,609,198 B1 | 8/2003 | Wood et al. |
| 6,615,251 B1 * | 9/2003 | Klug et al. ............. 709/218 |
| 6,618,579 B1 | 9/2003 | Smith et al. |
| 6,618,806 B1 | 9/2003 | Brown et al. |
| 6,623,415 B2 | 9/2003 | Gates et al. |
| 6,687,222 B1 | 2/2004 | Albert et al. |
| 6,754,833 B1 * | 6/2004 | Black et al. .................. 726/7 |
| 6,772,146 B2 | 8/2004 | Khemlani et al. |
| 6,791,974 B1 * | 9/2004 | Greenberg ................. 370/352 |
| 6,820,202 B1 | 11/2004 | Wheeler et al. |
| 6,832,202 B1 | 12/2004 | Schuyler et al. |
| 6,892,231 B2 * | 5/2005 | Jager .................. 709/220 |
| 2001/0012974 A1 | 8/2001 | Mahaffey |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0059141 A1 | 5/2002 | Davies et al. |
| 2002/0077978 A1 | 6/2002 | O'Leary et al. |
| 2002/0099826 A1 | 7/2002 | Summer et al. |
| 2002/0104006 A1 | 8/2002 | Boate et al. |
| 2002/0104017 A1 | 8/2002 | Stefan |
| 2002/0107788 A1 | 8/2002 | Cunningham |
| 2002/0165949 A1 | 11/2002 | Na |
| 2002/0184507 A1 | 12/2002 | Makower et al. |
| 2002/0188869 A1 | 12/2002 | Patrick |
| 2002/0191548 A1 | 12/2002 | Yionen et al. |
| 2003/0018915 A1 | 1/2003 | Stoll |
| 2003/0023880 A1 | 1/2003 | Edward et al. |
| 2003/0037142 A1 | 2/2003 | Munger et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0154403 A1 | 8/2003 | Kiensley |
| 2003/0159072 A1 | 8/2003 | Bellinger et al. |
| 2003/0163733 A1 | 8/2003 | Barriga-Caceres et al. |
| 2003/0177067 A1 | 9/2003 | Cowell et al. |
| 2003/1091549 | 10/2003 | Otsuka et al. |

FOREIGN PATENT DOCUMENTS

| | | |
|---|---|---|
| EP | 0884877 | 12/1998 |

| | | |
|---|---|---|
| EP | 0917119 | 5/1999 |
| WO | WO97/43736 | 11/1997 |
| WO | WO99/52051 | 10/1999 |
| WO | WO 00/68858 | 11/2000 |
| WO | WO 01/35355 | 5/2001 |
| WO | WO 01/43084 | 6/2001 |

OTHER PUBLICATIONS

Berry et al., A Potent New Tool For Selling Database, Cover Story, Business Week, Sep. 5, 1994, pp. 56-62.
Applets: The Source For JAVA Technology, JAVA, May 21, 1999, 2 pages.
Bechtel Construction Operations Incorporated Standardizes on Primavera's Expedition Contract Management Software, Business Wire, Business Editors/Hi-Tech Writers, New York, Jul. 27, 1999, p. 1.
Consortium Created to Manage Common Electronic Purse Specifications, Visa, http://www.visa.com/av/news/PRmisco051199.vhtml, printed Feb. 23, 2001.
Civitello, Jr., et al., Construction Operations Manual of Policies and Procedures, Third Edition, 2000.
Marchman, Construction Scheduling with Primavera Project Planner, Aug. 14, 1997.
Chester, Cross-platform integration with XML and SOAP, Oct. 2001.
Friedman, Dictionary of Business Terms, Third Edition, Copyright 2000, 3 pages.
Method of Protecting Data on a Personal Computer, IBM Technical Disclosure TDB 11-85, Order 85A 62426; p. 2530, Nov. 1, 1985.
CORBA Overview, May 25, 1999, 14 pages.
Harris, Planning Using Primavera Project Planner P3 Version 3.0, Users Guide, 1999.
Johnston, Pondering Passport: Do You Trust Microsoft With Your Data?, www.pcworld.com/resource/printable/article/0.aid,63244,00, asp, Sep. 24, 2001.
Primavera and PurchasePro.com to Create E-Commerce Marketplace for Construction Industry, Primavera Ships P3, Version 3.0, Press Release, Sep. 21, 1999.
Primavera How the World Manages Projects, Expedition Contract Control Software, www.primavera.com, Jun. 23, 2005.
Kormann, Risks of the Passport Single Signon Protocol, Computer Networks, Elsevier Science Press, vol. 33, pp. 51-58, Jun. 22, 2005.
Safe Single-Sign-On Protocol with Minimal Password Exposure No Decryption and Technology Adaptivity, IBM Corporation, IBM Technical Disclosure, TDB 03-95, Order 95A, pp. 245-248, Mar. 1, 1995.
Servelet/Applet/HTML.Authentication Process with Single Sign-On, IBM Corporation, IBM Order 00A60004, Jan. 1, 2000.
Jakobsson et al., Secure and lightweight advertising on the web, Computer Networks, 31 (1999), 1101-1109.
Shibata, Seventh International Conference on Parallel and Distributed Systems: Workshops, IEEE Computer Society, Jul. 4-7, 2000.
SmartAxis, Load Cash on to Your E-Purse Card, Supported Currencies and Schemems, http://www.smartaxis.co.uk/seller/howitworks.html, printed Feb. 23, 2001.
Jepsen, SOAP Cleans up interoperability problems on the web, Jan. 2001.
Temporary Global Passwords, IBM Corporation, IBM Technical Disclosure TDB vol. 36, No. 3, Order 93A 60636 03-93, pp. 451-454, Mar. 1, 1993.
Ritz, Total Construction Project Management, McGraw-Hill, 1994.
Fujimura et al., XML Voucher: Generic Voucher Language, Internet Draft, Trade Working Group, www.ietf.org, Feb. 2003.
eCharge, eCharge Corporation, www.echarge.com, Dec. 3, 1999.
Tracy Pletz et al., Summary of the at your risk architecture, Jun. 3, 1999.
Siebel, Siebel: Ensuring Customer Success, www.siebel.com, Nov. 17, 1999.
OMG, Welcome to OMG's CORBA for Beginners Page!, www.omg.com, May 25, 1999.
Sun MicroSystems, Inc., Schema for Representing CORBA Objects in an LDAP directory, May 21, 1999.
OMG, Library, www.omg.com, May 29, 1999.
OMG, What is CORBA?, , www.omg.com, May 25, 1999.
Overvierw of CORBA, , www.omg.com, May 25, 1999.
JAVA, JAVA™ Technology in the Real World, java.sun.com, May 21, 1999.
JAVA, JAVA™ Servlet API, java.sun.com, May 21, 1999.
JAVA, Staying in Touch with JNDI, java.sun.com, May 21, 1999.
Java, Java™ Remote Method Invocation (RMI) Interface, java.sun.com, May 21, 1999.
JAVA, Banking on JAVA™ Technology, java.sun.com, May 21, 1999.
JAVA, The JDBC™ Data Access API, java.sun.com, May 21, 1999.
Anne Thomas, Enterprise JAVABEANS™ Technology: Server Component Model for the Java™ platform, java.sun.com, May 21, 1999.
S. R. Hiremath, Numerical Credit Scoring Model, Operations Research Bulletin, WA13.16, Apr. 30, 1975.
Reuters, Getting Smart with Java: Sun Micro Says American Express to Use Java for Smart Card, www.abcnew.go.com/sciences/tech, Jun. 6, 2000.
David Bank, Cash, Check, Charge—Whats Next?, Seattle Times, Mar. 6, 1998.
Gerry Vandenengel, Cardson the Internet: Advertising on a $3 Bill, Industry Intelligence, Feb. 1, 1995.
Kim A. Strassel, Dutch Software Concern Experiments with Electronic 'Cash' in Cyberspace, Wall Street Journal, Apr. 17, 1995.
Jeffrey Kutler, Cash Card Creator Looking Beyond Mondex, Feb. 9, 1995.
David Post, E-Cash: Can't Live With It, Can't Live Without It, The American Lawyer, pp. 116-117, Mar. 1, 1996.
Russell Mitchell, Cyberspace: Crafting Software . . . , Business Week, pp. 78-86, Feb. 27, 1995.
Jeffrey Kutler, A Different Drummer on the Data Highway, American Banker, May 12, 1995.
Stephen Eppmt, A pLayer Goes After Big Bucks in Cyberspace, American Banker, May 5, 1995.
Robert Barnham, Network Brings Together Producers and Companies, Bests Review Feb. 1, 1994.
Vanessa Houlder, OFT Gives the Individual Top Priority: Report Calls for Deregulation of Business Lending, The Financial Times, Jun. 8, 1994.
Kennedy Maiz, Fannie Mae on the Web, Newsbyte, May 8, 1995.
Anne Knowles, Improved Internet Security Enabling On-Line Commerce, PC Week, Mar. 20, 1995.
Aversion Therapy: Banks Overcoming Fear of the Net to Develop Safe Internet-based Payment System w/ Netscape Communicator, Network World, Dec. 12, 1994.
Don Clark, Microsoft, Visa to Jointly Develop PC Electronic-Shopping Software, Wall Street Journal, The, B9, Nov. 9, 1994.
Understanding Product Data Management, Hewlett-Packard Company, Apr. 26, 1999.
Getting Started: Specific GE TPN Post Service Use Guidelines, GE, Apr. 26, 1999.
Resource Center: Consolidated Edison Selects GE TPN Post, GE, Apr. 26, 1999.
ThomasNet, Thomas Publishing Company, Apr. 26, 1999.
SoluSource: For Engineers By Engineers, Thomas Publishing Company, Apr. 26, 1999.
Harris InfoSource, Apr. 26, 1999.
Welcome to MUSE, MUSE Technologies, Apr. 26, 1999.
Product Data Integration Technologies, Inc., PDIT, Apr. 26, 1999.
SBA: Pro-Net, SBA, Apr. 1, 1999.
FreeMarkets, FreeMarkets Online, Inc., Apr. 26, 1999.
Associates National Bank (DE) Credit Card Services, The Associates, www.theassocitheassociates.atescomcom/consumer/credit_cards/main.html, Apr. 6, 1999.
At Your Request, Wingspanbankcom, Sep. 28, 1999.
Robyn Meredith, Internet bank moves closer to virtual reality, USA Today, May 5, 1995.
Marvin Sirbu and J.D. Tygar, NetBill: An Internet Commerce System Optimized for Network Delivered Services, http://www.ini.cmu.edu :80/netbill, pp. 1-12, Feb. 27, 1995.

The check is in the email., Information Today, vol. 12, No. 3, Mar. 1, 1995, ISSN: 8755-6286.

The Gale Group, G&D America's Multi-application Smart Card Selected for Combined Payroll and 'Virtual Banking' Program in Mexico, wysiwyg://0/http://www.dialogclassic.com/history, Business Wire, Apr. 24, 1998, p4241047.

Richard Mitchell, Netlink Goes After An Unbanked Niche, wysiwyg://0/http://dialogclassic.com/history, ISSN: 1093-1279, Sep. 1999.

International Search Report, mailed Sep. 28, 2002.

Articles from Network Computing: Philip Carden, The New Face of Single Sign-On, Mar. 22, 1999, 19 pages.

http://developer.novell.com/research/devnotes/1999/november/05/03.htm, 2 pages, printed Dec. 29, 2000.

http://blockade.com/products/pd_products_websso.html, 3 pages, printed Dec. 29, 2000.

* cited by examiner

SYSTEM AND METHOD FOR PROVIDING DISCRIMINATED CONTENT TO NETWORK USERS

FIELD OF THE INVENTION

The present invention relates to a method for providing customers with transparent access to information from various partnered service providers while maintaining an environment of a single service provider.

BACKGROUND OF THE INVENTION

Various service providers often form business alliances or partnerships in which one service provider will "brand" its services to match the appearance or message of a partner's service. An example of such a relationship is branded credit cards, which are issued by one service provider, but are branded to present the name or logo of another service provider. In such a relationship, the two service providers typically operate within related, but non-overlapping market sectors. The partnership provides mutual benefits to both service providers, because whenever a customer uses the branded services, both partners are involved in the transaction, and the customer can be said to be using both services in unison. In addition, branded services bolster customer loyalty to both service providers.

Service providers are increasingly turning to the Internet, or World Wide Web ("Web"), as an additional outlet for providing their services. In the Internet context, a customer of the service provider accesses the service provider's services using a networked computer. The customer typically must "log in" to a service provider's system by submitting login data (usually a user name and password) to verify the customer's identity. If the user name and password are approved, then the customer may access the service provider's system resources during the ensuing login session. The login session ends after the customer stops using the resources for a predetermined period of time, or when the customer triggers a "log off."

A customer of one Internet-based service provider may wish to access resources provided by a second Internet-based service provider. In the context of the Web, the service providers host websites (also called "sites," "web pages," or simply "pages") that present an easily accessible user interface between a user and the service provider. The current inter-page access model is to "jump" from one service provider's website to the next using graphically selected hyperlinks, by typing a destination site, or by other means. Each different provider typically requires a different login data set, so in order to switch from one provider to another, the customer must enter the login data associated with the next provider. This can be a cumbersome process, as the customer must memorize or record many different sets of login data.

Several methods are known for reducing the inconvenient process of logging in to multiple service providers. These systems allow the customer to operate within a "Single Sign On" (SSO) environment. The SSO provides "seamless" or "transparent" access between Internet resources wherein the customer only has to log in once to access all of the service providers with which he has an account. Once logged in, the customer may jump from website to website without having to re-enter login information.

The SSO's provided by the prior art use a traditional inter-page access model, in which a user of one page simply jumps from one website to the next without experiencing any inter-site interconnectivity. Although each website may have related or similar-looking pages, each separate website may have differences in appearance and functionality. Under the current inter-page access model, the content of one service provider's website is typically uninfluenced by and unrelated to the content of previously visited service providers' websites. This is typically true even when the service providers have a business partnership. This type of inter-page access is "non-discriminatory" in that when a customer requests a second web page, neither the owner of the first web page nor the owner of the second web page discriminates whether there is a relationship between the first and second web page owners.

A drawback with the current non-discriminatory inter-page access system is that it can have a negative impact on business partnerships. For example, a customer may have a credit card that is provided by a bank, but that is branded with the markings of a stock broker as part of a business relationship between the bank and the stock broker. In addition, the bank and the stock broker may each have an Internet website. When the customer accesses the stock broker's website to make a stock transaction, he or she may wish to check his stock broker-branded credit card account. Using conventional inter-page access, when the customer accesses the bank's website the customer will see an entirely different web page, which may not appear to be affiliated with the stock broker at all. This lack of brand continuity can weaken the customer's inclination to use the two service providers in unison, and may lead to customer confusion.

Conventional SSO systems do nothing to solve this problem. Although there is continuity of access between the websites, which is provided by the SSO system, there is a discontinuity between the service providers because the branded relationship between the two service providers does not exist in the web context.

In addition to weakening the customer's brand association and loyalty, nondiscriminatory inter-page access between service providers can also directly interfere with business partnerships by providing conflicting services to customers. A central service provider may have a partnership with many partner service providers that compete against one another in the same market. To continue with the above example, a single credit card issuer may offer various stock broker-branded credit cards pursuant to partnerships with several competing stock brokers. The credit card issuer may wish to advertise the availability of all of these different stock broker-branded credit cards to potential customers on its website. When a customer accesses the credit card issuer's website by way of a link on his selected stock broker's website, he will see advertisements for the services of competing stock brokers. An individual stock broker would be opposed to presenting advertisements for its competitors' services to customers who have already become affiliated with that stock broker, and this would create a disincentive to enter into a business partnership with the credit card provider. Although such advertising may be beneficial to the credit card provider, it would, in effect, facilitate competition between the various stock brokers, which may strain the business relationship between the partnered companies.

The problems presented by the traditional inter-page access model increase as the complexity of the business partnerships increases. These problems also increase as users of various service providers employ SSO systems to obtain seamless access to various service providers. In the developing environment of the Internet, users may become less loyal to partnered groups of services because these partnerships are very hard to distinguish. Other problems with conventional inter-site access and SSO systems exist.

It would therefore be desirable to provide a system and method of providing discriminated system resources to users of multiple partners' systems, and to provide other improvements.

SUMMARY OF THE INVENTION

The present invention addresses these and other problems caused by traditional nondiscriminatory access to multiple service providers and other systems and methods of Internet access. The present invention, in one regard, provides a method and system for providing discriminated system resources to a user during a single login session.

The system and method of the present invention help maintain continuity of appearance and message between visited websites, provide a secure connection between websites, and assist in fostering business partnerships.

In an embodiment of the present invention, a partner system receives a request to access system resources that are provided by the partner system from a host system, which is being used by a user who has logged in to the host system. In addition to this request, the partner system receives host system data and user data. Using the received data, the partner system identifies the host system and the user and determines whether access to the partner system resources is authorized. If access is authorized, then the partner system selects discriminated partner system resources that are associated with the particular host and the particular user and transmits those resources to the host system, the user, or both the host system and the user.

Various techniques for selecting discriminated partner system resources may be used with the present invention. In one embodiment, the partner system identifies the user's partner system account information, selects a predetermined web page that is associated with the host system, and integrates these into a discriminated host system resource. In another embodiment, the partner system modifies an existing web page to create a new discriminated web page which imitates the graphical appearance of the host system's web page and incorporates information that does not conflict with the host's business into the discriminated host system resource.

In a second method, the host system receives user data, such as a user name and password, from a user and determines whether the user is authorized to use the host system. If the user is authorized to use the host system, the host system provides the user with host system resources. The host system resources include an option to access partner system resources, which may be in the form of a hyperlink. When the user requests access to partner system resources, the host system transmits some or all of the user data to the partner system, along with host data that uniquely identifies the host.

The partner system then transmits the partner system resources to the host system. If the partner system resources are discriminated, then the host system forwards them to the user. If the partner system resources are not discriminated, then the host system discriminates the partner system resources according to the host's requirements before sending them to the user. Such discrimination may be in the form of adding, removing, or manipulating information that is being provided by the partner system.

A system is also provided for carrying out the above methods. The system comprises instructions for carrying out the steps of the methods of the invention.

BRIEF DESCRIPTION OF THE DRAWINGS

The present invention may be better understood when described in conjunction with the following exemplary figures.

DETAILED DESCRIPTION OF THE EMBODIMENTS

Figure 1:
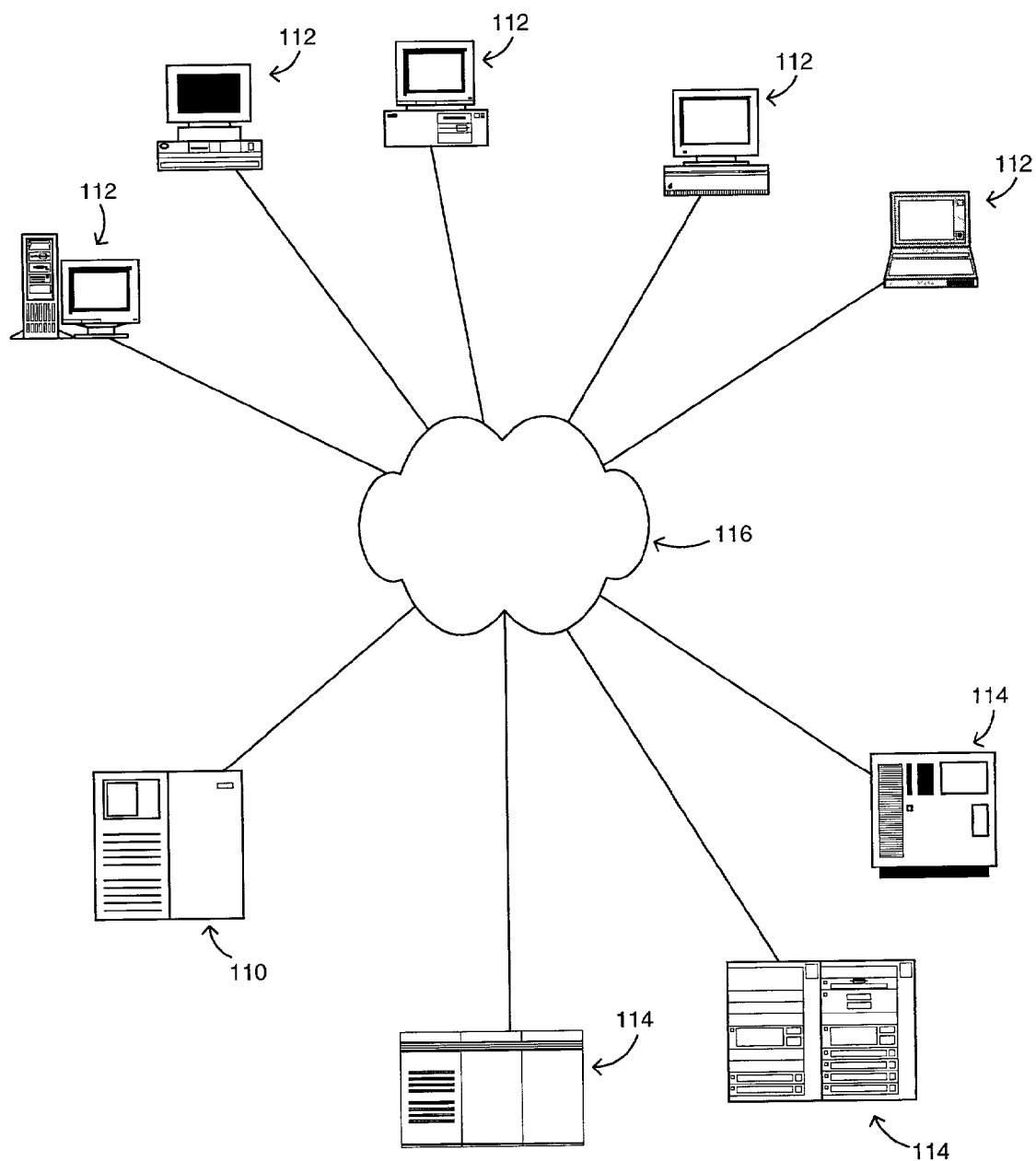
FIG. 1 is a depiction of an embodiment of a networked communication system of the present invention.

The present invention provides discriminated system resources to a user. In general, a user accesses a system provided by one of two or more partnered entities, then requests to access information or resources provided by another of the partnered entities. At this point, the partner through which the user makes this request becomes the host. These resources may include any information transmitted over a communication network, such as financial information, advertising, special offers, news items, press releases, hyperlinks, or any other information or promotional material related to a user, host, partner or third party. In addition, the specific resources sought by the user may comprise only a portion of the total resources that will be made available to the user as a result of the request.

These resources supplied by the partners are discriminated. Discrimination is performed by supplementing, modifying, filtering, or otherwise selectively retrieving resources to support and bolster the business relationship between the partners and provide other benefits to the partners, a user, third parties, or all of these entities. Different criteria for discrimination may be used between each pair of partners. For example, one partner, when acting as a host, may discriminate against advertisements for goods or services competing with that partner's services, but allow other information to be provided in an unmodified form. Discrimination may also include modifying the partner system resources to comport with the host system's requirements. For example, the partner system resources may be "branded," either by the partner or the host, so that they appear to be provided by the host system. This may be accomplished by using specific color schemes or text fonts, by incorporating specific graphical images, or by other means.

The invention is generally described in terms of an Internet-based credit card provider partnered with several other Internet-based service providers. However, it should be appreciated that this embodiment is exemplary only and that the invention is applicable in any situation where an Internet-based entity wishes to maintain continuity of appearances with a partnered Internet-based entity. "Partner" herein means any entity that provides goods or services by means of a communication network, and that is in a business relationship with other partner entities. "User" herein means any entity that is a consumer or user of the goods or services provided by more than one partner. When a user accesses the services of a partner, that partner becomes the "host" for the ensuing login session relative to any partners accessed directly from that "host." Thus "host" and "partner" are relative terms, and a host in one situation may be a partner in another situation, depending on which partner the user accesses first. A partner to one host may also be a host relative to any partners accessed through that partner's system. For clarity, a single partner system has been selected as an exemplary host, and another single partner has been selected as an exemplary partner, however this is not intended to limit the present invention. Herein, a "system" means any means for accessing and communicating through a communication network, storing information, or maintaining system resources.

Also, for illustration purposes only, the invention is described in terms of the existing Internet. It should be appreciated, however, that the present invention could be implemented through a variety of networks such as a telephone network, a satellite or cellular connection network, an electro-optical network, or any other communication network. The skilled artisan will also recognize that the invention could be implemented in variations of networks, such as the so-called Internet Protocol Next Generation (IPng) or any other variations of networked packet-switched or other technology.

The methods of this invention may be embodied into a system. Such a system may use suitable computer systems or combinations of computer hardware and computer software. As indicated herein, a system of the present invention may be practiced using a networked communication system. FIG. 1 depicts an embodiment of a system of the present invention that is operated over a networked communication system. A host system 110 is connected to a multitude of user systems 112 and partner systems 114 through an intercommunication means 116, such as the Internet, a local area network ("LAN"), or a wide area network ("WAN"). The host system 110 and each of the partner systems 114 provides system resources to user systems 112 having access to the host and partner systems 112, 114 using the same intercommunication means 116. As noted herein, any of the partner systems 114 may act as the host system 110 depending on the sequence in which the systems are accessed by the user systems 112.

Those skilled in the art should appreciate that computer-operable programs defining the methods and functions described herein can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks. It should be understood, therefore, that such media, when carrying such information, represent alternate embodiments of the present invention.

The system resources provided by the host system 110 and the partner systems 114 may be any information that is useful to the host, partner, or user. In one embodiment, these resources comprise information such as financial information regarding the users of the user systems 114. In another embodiment of the invention, these resources comprise non-financial information such as news, advertisements, and graphical information. In yet another embodiment, these resources comprise incentive reward information, such as frequent flyer mile account data. These resources may also be a combination of the above embodiments, and may include other information. Each partner system 114 and host system 110 may store these resources on its own system, or on other systems to which it has access.

In one embodiment, the host system 110 is an Internet website maintained by a partner that may be a provider of services or goods, such as a stock brokerage, and the partner systems 114 are websites maintained by business partners of the host who may be providers of related goods or services, such as a credit card provider that offers credit cards branded with the host's logo. Internet websites are generally known in the art, and a skilled artisan will be able to implement such websites in conjunction with the present invention.

Figure 2:
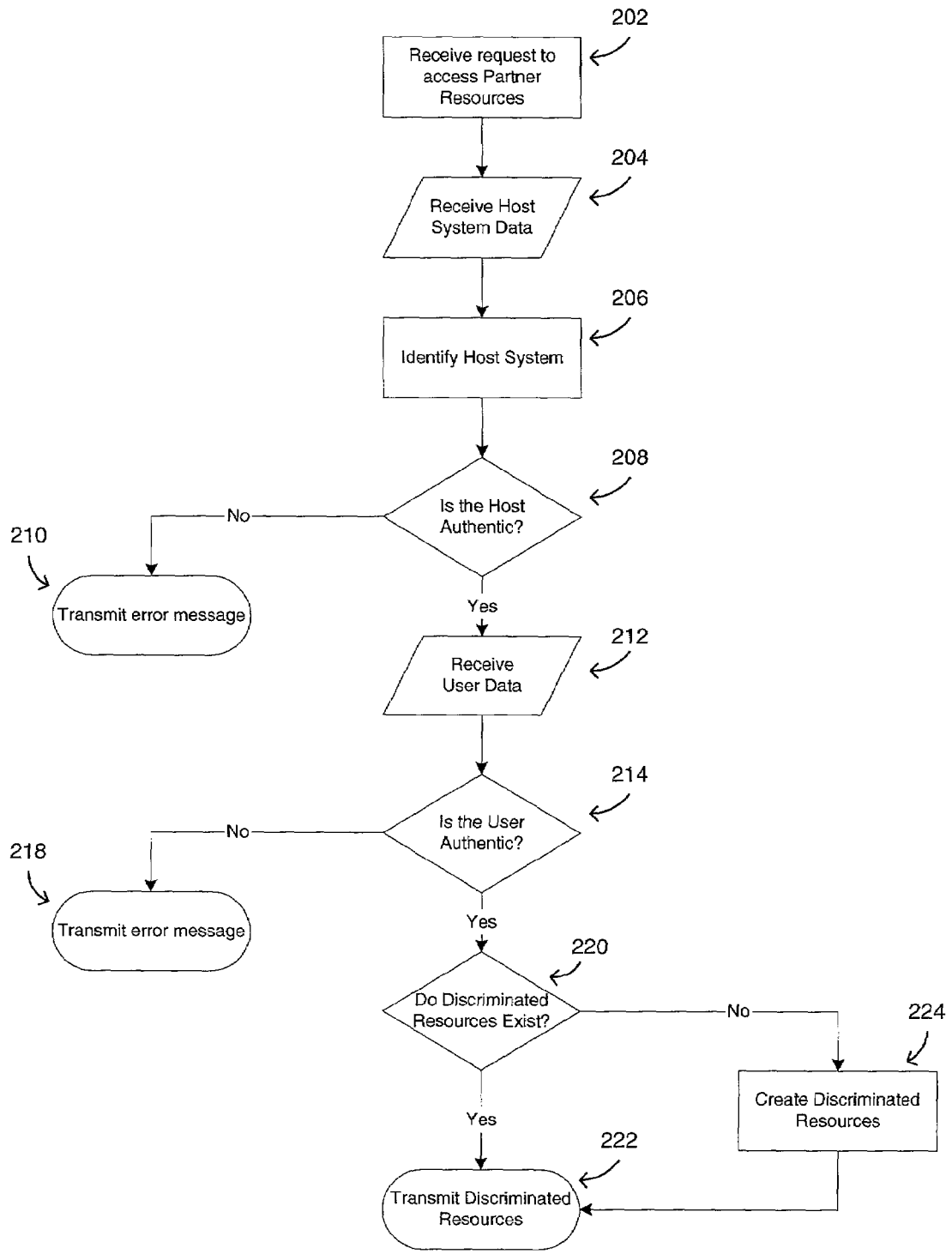
FIG. 2 is a flowchart demonstrating the steps of one embodiment of a method of the present invention.

Referring now to FIG. 2, an embodiment of a method for providing discriminated partner system resources to a user system 112 is described. The method illustrated in FIG. 2 depicts the embodiment as it is performed by a partner system 114. The method will generally comprise a user system 112 being operated by a user who has already logged in to a host system 110, and now wishes to access partner system resources. The initial login is performed when the user logs in to the host system 110, and no additional logins should be required. The method begins when a partner system 114 receives a request to access partner system resources 202 from a host system 110. In one embodiment of the invention this happens when a user, who is logged in to the host system 110, selects a hyperlink on the host's website that corresponds to the partner's website. This correlation may be apparent to the user or concealed. For example, an apparent correlation would exist if the website displayed a hyperlink stating "Check your [Name of partner system] account." In such a case, users would likely understand that they were about to receive resources from a different entity; specifically, the partner system 114. In an embodiment using a concealed correlation, the web page may display a hyperlink simply stating "Check your credit." In this case, the user may or may not know that his credit information will be received from a separate entity.

Before providing partner system resources to the host system 110, the partner system 114 receives host system data 204. The partner system 114 uses the host system data to identify the host 206 so that the correct discriminated partner system resources may be transmitted to the host system 110 of the user system 112.

The host system data may be also used for additional purposes. In one embodiment of the invention, the partner system 114 uses the host system data to determine whether the entity accessing the partner system 114 is an authorized host 208. This verification process prevents unauthorized access, use, or manipulation of the partner system resources. In one embodiment, the partner system 114 receives host system data 204 from the host system 110, with which the partner system 114 can positively identify the host system 206. For example, the host system 110 may send an identification code to the partner system 114, which the partner system 114 compares to a database of host identifiers. As another example, the host system 110 may access the partner system 114 through a portal designated specifically for use by that host system 110, in which case the partner system 114 identifies all communications through that portal as being from a particular business host. The partner system 114 may also require independent verification of the host system's identity before proceeding. Such verification systems are known in the art, and a skilled artisan will be able to implement a verification system without undue experimentation. If the partner system 114 fails to identify the host system 110 as an authorized host, then the partner system 114 will not transmit partner system resources and may transmit an error message 210.

The partner system 114 also receives user data 208. The partner system 114 uses the user data to identify the user 214 so that the partner system 114 can locate the particular partner system resources associated with that user for transmittal. The partner system 114 may also require user authentication to ensure that the user is not an impostor. In order to provide seamless access to the partner system resources, however, the user of the user system 112 should not have to provide any input during this authorization step. Seamless user authorization may be accomplished by employing any number of existing Single Sign On (SSO) systems. One such system is discussed in U.S. patent application Ser. No. 09/591,687, filed by Rosko et al., which is hereby incorporated by reference for all purposes and in a manner consistent with the present invention. Another solution is provided by U.S. Pat. No. 5,684,950 issued to Dare et al. Such solutions may provide a universal database of correlated user names and passwords to which all of the partners have access, or may have a trusted third party or authentication server verify the user's identity. Other SSO systems may provide for a universal session manager to control login operations. The present invention may employ these or any other means for seamless access provided by the art. Preferably, when the seamless access system will provide "secure" access to the various systems, that is, a level of security between websites, such that the risk of data theft, loss, or damage is substantially reduced compared to unsecured access systems. Regardless of the particular SSO employed to authenticate the user, the partner system 114 determines whether the user is an authentic user 216, and if the user is not properly authenticated, the partner system 114 will not provide partner system resources and it may transmit an error message 218.

After the host and user have been successfully identified and authorized, the partner system 114 determines whether discriminated resources exist 220. Existing discriminated resources may comprise, for example, a pre-established web page that is specifically designated for that particular host and bears that host's indicia and color schemes, as well as other information that may be approved by the host or consistent with the host's business. Existing discriminated resources may also comprise financial account data for a particular user. If discriminated resources exist, then the partner compiles the resources, such as by populating a host-specific web page with a user's financial information, and transmits the discriminated resources 222.

If discriminated resources do not exist, then in one embodiment, the partner system 114 may create discriminated resources 224. The partner system 114 may create discriminated resources in a number of ways. In one embodiment, the partner system 114 identifies graphical information regarding the host system's web page and recreates this information when transmitting the partner system resources, providing the appearance, to the user, that the discriminated resources originated from the host system 110. For example, the partner system 114 may analyze the color schemes, shapes, sizes, and brand labels of a host's website, then incorporate these into the discriminated partner system resources. Such analysis may be facilitated by providing for a universal language or decoding key to be used by all of the partners. In another embodiment, the partner system 114 identifies and selects discriminated resources from a larger pool of resources according to a previously established agreement between the host and the partner. For example, the host and partner may agree that certain classes of resources, such as particular types of advertisements, may be transmitted, but others may not. In one embodiment, the partner system 114 classifies each host system 110 according to that host's type of business, selects advertisements that do not compete with that host's type of business, and incorporates these advertisements into the discriminated partner system resources.

Figure 3A:
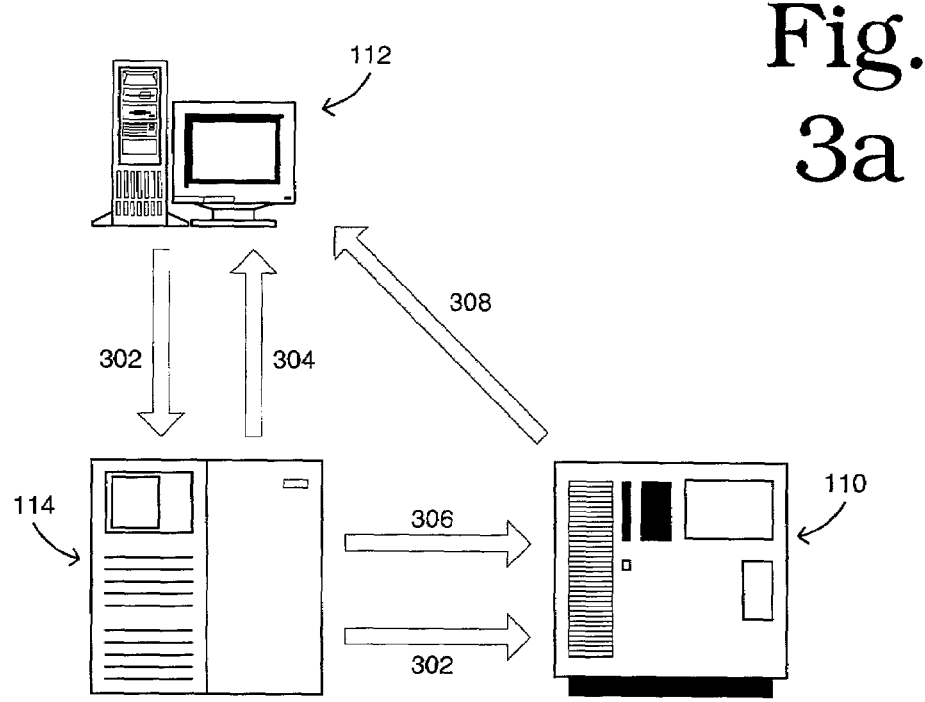
FIG. 3a is a schematic depiction of an embodiment of the invention in which the partner system transmits discriminated partner system resources directly to a user.

The partner system 114 transmits the discriminated partner system resources 222 to either the host system 110 or to the user system 112. FIG. 3a schematically depicts an embodiment of the invention in which the partner system 114 transmits the discriminated partner system resources directly to the user system 112. In the embodiment of FIG. 3a, the user system transmits user data 302 to the host system 110, and receives host resources 304 directly from the host system 110. When the user system 112 instructs the host system 110 to retrieve partner system resources from the partner system 114, the host system 110 transmits host data 306 and all or part of the user data 302 to the partner system 114. Upon approval of the host system 110 and the user and location or creation of discriminated partner system resources, the partner system 114 transmits the discriminated partner system resources 308 to the user system 112 for viewing by the user.

Figure 3B:
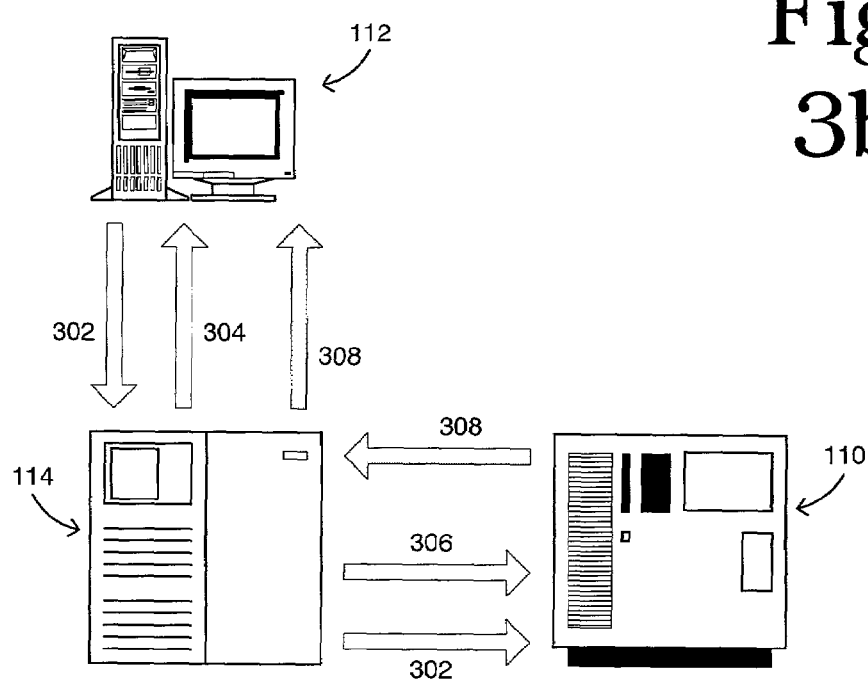
FIG. 3b is a schematic depiction of an embodiment of the invention in which the partner system transmits discriminated partner system resources to a host system, which then transmits discriminated partner system resources to a user.

In another embodiment, depicted schematically in FIG. 3b, the partner system 114 transmits the discriminated partner system resources 308 to the host system 110, which then transmits them to the user system 112 to be viewed by the user. In this embodiment, the host system 110 may perform further discriminating functions on the partner system resources by adding, modifying, or removing information.

The discriminated partner system resources may be displayed to the user in a number of ways. In one embodiment, in which the user accesses the host and partner systems 110, 114 through a computer terminal attached to the Internet, the discriminated partner system resources are displayed on a separate web browser "window" that is invoked when the user requests access to the partner system resources. In another embodiment, the discriminated partner system resources are displayed in a frame within the same web browser window that displays the host system resources. The host system resources and the discriminated partner system resources may be viewed simultaneously, or they may be viewed separately. In a preferred embodiment, the user may seamlessly move back and forth between views of the host system resources and the discriminated partner system resources.

Figure 4:
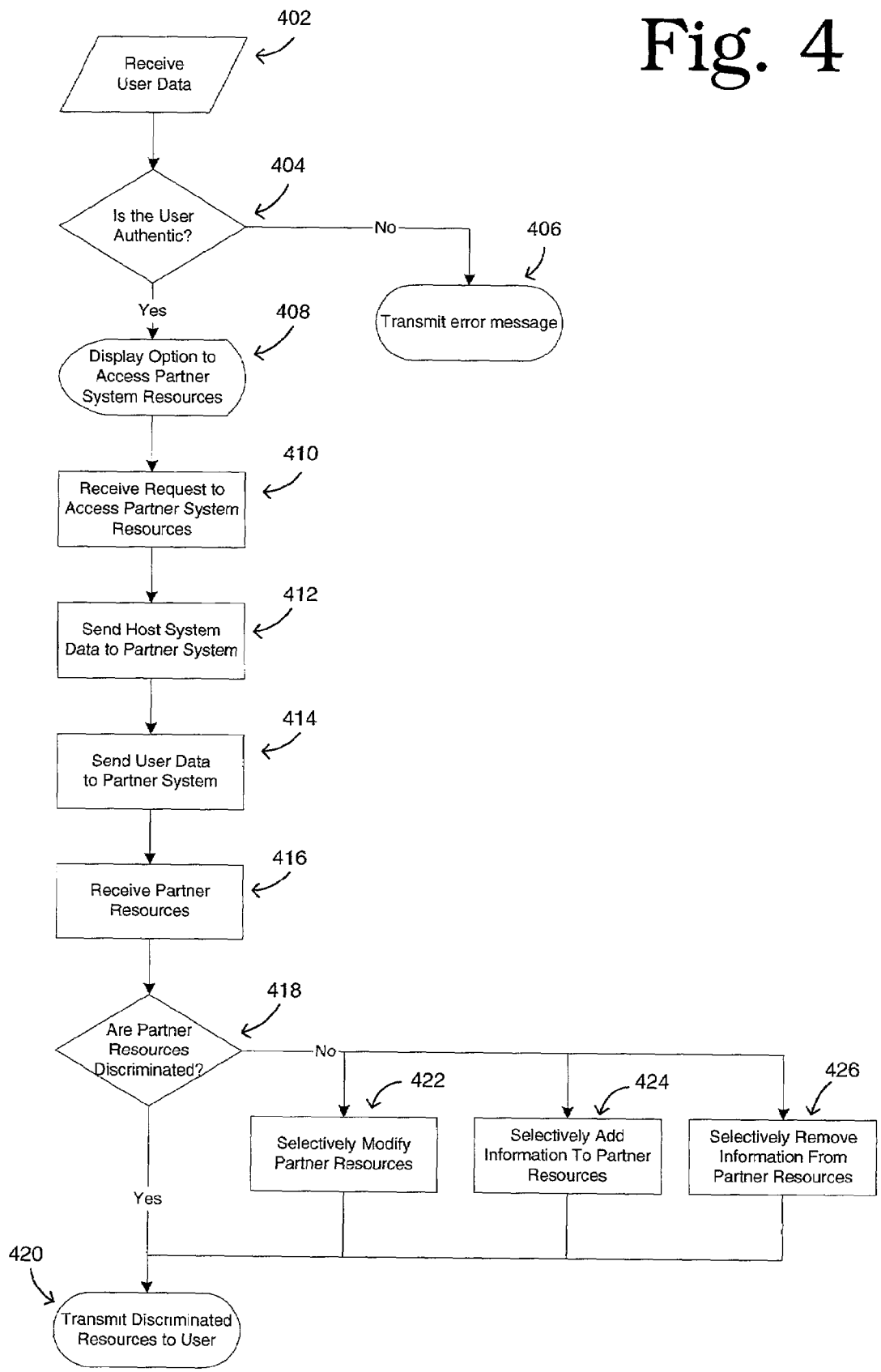
FIG. 4 is a flowchart demonstrating the steps of another embodiment of a method of the present invention.

Referring now to FIG. 4, another embodiment of a method for providing discriminated partner system resources to a user system 112 is provided. The method illustrated in FIG. 4 depicts the embodiment as it is performed by a host system 110. In this embodiment, the user transmits user data to the host system 402, which the host system 110 uses to determine whether the user is authentic 404. The user data may be manually entered by the user, retrieved from storage on a fixed storage medium, such as a computer hard drive, or stored on a portable storage device, such as a magnetic card or other storage medium. The user data may also comprise biometric information inherent to the user, such as a retinal image. Any other suitable user data transmittal scheme may be used. The user may access the host system 110 from any networked terminal, such as a home computer or a public computer kiosk.

Authentication procedures have been described herein, and any suitable authentication process may be used. If the host system 110 determines that the user is not an authentic user, the host system 110 will not transmit host resources to the user and may transmit an error message to the user 406. If the host system 110 determines that the user is an authentic user, then it will transmit host system data to the user. Among this data will be an option to access partner system resources 408. This option may or may not indicate to the user that, by selecting the option, the user will be provided with resources originating from somewhere other than the host system 110.

If the user requests partner system resources 410, the host system 110 attempts to retrieve partner system resources from the partner system 114. The host system 110 sends host system data 412 and all or part of the user data 414 to the partner system 114. The user data and host system data transmitted to the partner server may comprise information necessary to identify the user and the host system 110, and may further comprise information necessary to authenticate the user and the host system 110. In one embodiment, the host system 110 provides the partner system 114 with information that has been received from a third-party authentication server. Such authorization methods are known in the art, and any suitable method may be used with the present invention to provide the user with seamless access to host and partner system resources.

The host system 110 then receives partner system resources 416 from the partner system 114, and determines whether the partner system resources are discriminated in a manner acceptable to the host system 418. If the partner system resources are discriminated in a manner acceptable to the host system 110, then the host system 110 transmits the partner system resources to the user system 420 to be viewed by a user. If the partner system resources are not suitably discriminated, the host system 110 may create discriminated resources by modifying the partner system resources 422, or adding to the partner system resources 424. For example, a host system 110 may modify the color scheme of a web page received from a partner system 114 to match the host's web page, and may also add extra material such as advertisements or news items. The host system 110 may also selectively remove material from the partner system resources 426 to produce suitable discriminated resources. For example, the host system 110 may remove an advertisement for a competing service that was received as part of the non-discriminated partner system resources.

After the host system 110 has created or modified the resources to be suitably discriminated, the resources are transmitted to the user 420. A schematic diagram depicting the flow of data and resources in this embodiment is depicted in FIG. 3*b*, which is described elsewhere herein.

Although the present invention has been described in terms of certain preferred embodiments, it is not limited to these embodiments. Alternative embodiments and modifications which would still be encompassed by the invention may be made by those skilled in the art, particularly in light of the foregoing teachings. Therefore, the following claims are intended to cover any alternative embodiments, modifications or equivalents which may be within the spirit and scope of the invention as defined by the claims.

We claim:

1. A method of providing discriminated partner system resources to a user of a host system during a single login session comprising:
   receiving a request to access partner system resources through a host system, said host system comprising a financial service provider system with which a user of said host system has one or more financial accounts;
   receiving host system data;
   identifying said host system;
   receiving user data;
   identifying said user based at least in part on said user data;
   identifying said user's financial account data; and
   providing discriminated partner system resources to said user, said discriminated partner system resources being selected based at least upon a preexisting association between the host system and the partner system, a preexisting association between the user and the partner system, and said user's financial account data;
   wherein providing discriminated partner system resources comprises creating discriminated partner system resources identified with said host system comprising:
   identifying graphical information used by said host system,
   replicating said graphical information,
   classifying said host system,
   identifying non-conflicting additional partner system resources that do not conflict with said host system's classification, and
   incorporating said replicated graphical information and said non-conflicting additional partner system resources into a standard partner system resource to create a discriminated partner system resource.

2. The method of claim 1 wherein receiving host system data comprises receiving host system data from said host system.

3. The method of claim 1 wherein identifying said host system comprises identifying said host system based at least in part on said host system data.

4. The method of claim 1 wherein receiving user data comprises receiving user data from said host system.

5. The method of claim 1 further comprising authenticating said request to access partner system resources.

6. The method of claim 1 further comprising transmitting said discriminated partner system resources to at least one of said host system and said user.

7. The method of claim 1 wherein said partner system resources and host resources are accessible through a web browser.

8. The method of claim 1 wherein said user data comprises a user name and a user password.

9. The method of claim 1 wherein said user data comprises authentication data provided by a single sign on authentication system.

10. The method of claim 1 wherein providing discriminated partner system resources to said user further comprises:
    selecting, based at least in part on said financial account data, a discriminated web page identified with said host system from a plurality of discriminated web pages.

11. The method of claim 1, wherein said additional partner system resources comprise financial information.

12. The method of claim 1, wherein said additional partner system resources comprise incentive reward information.

13. A system for providing discriminated partner system resources to a user of a host's system resources during a single login session comprising:
    a partner system for providing partner system resources through a computer network, wherein said partner system comprises downloadable executable code stored on computer-readable storage media for performing the following:
    receiving a request to access partner system resources through a host system said host system comprising a financial service provider system with which a user of a host's system resources has one or more financial accounts;

receiving host system data;

identifying a host system;

receiving user data;

identifying said user based at least in part on said user data;

identifying said user's financial account data; and providing discriminated partner system resources to said user, said discriminated partner system resources being selected based at least upon a preexisting association between the host system and the partner system, a preexisting association between the user and the partner system, and said user's financial account data;

wherein providing discriminated partner system resources to said user comprises creating discriminated partner system resources identified with said host system comprising downloadable executable code stored on computer-readable storage media for performing the following:

identifying graphical information used by said host system;

replicating said graphical information;

classifying said host system;

identifying nonconflicting additional partner system resources that do not conflict with said host system's classification; and incorporating said replicated graphical information and said non-conflicting additional partner system resources into a standard partner system resource to create a discriminated partner system resource.

14. The system of claim 13 wherein said receiving host system data comprises instructions for receiving host system data from said host system.

15. The system of claim 13 wherein said identifying a host system comprises instructions for identifying the host system based at least in part on said host system data.

16. The system of claim 13 wherein said receiving user data comprises instructions for receiving user data from said host system.

17. The system of claim 13 further comprising downloadable executable code stored on computer-readable storage media for authenticating said request to access partner system resources.

18. The system of claim 13 further comprising downloadable executable code stored on computer-readable storage media for transmitting said discriminated partner system resources to at least one of said host system and said user.

19. The system of claim 13 wherein said partner system and said host system are accessible through a web browser.

20. The system of claim 13 wherein said user data comprises a user name and a user password.

21. The system of claim 13 wherein said user data comprises authentication data provided by a single sign on authentication system.

22. The system of claim 13 wherein said providing discriminated partner system resources to said user further comprises downloadable executable code stored on computer-readable storage media for performing the following:

a set of instructions for selecting, based at least in part on said financial account data, a discriminated web page identified with said host system from a plurality of discriminated web pages.

23. The system of claim 13, wherein said additional partner system resources comprise financial information.

24. The system of claim 13, wherein said additional partner system resources comprise incentive reward information.

* * * * *

UNITED STATES PATENT AND TRADEMARK OFFICE
CERTIFICATE OF CORRECTION

PATENT NO. : 7,266,839 B2
APPLICATION NO. : 09/902612
DATED : September 4, 2007
INVENTOR(S) : Bowers et al.

Page 1 of 1

It is certified that error appears in the above-identified patent and that said Letters Patent is hereby corrected as shown below:

Title Page Please insert -- (73) Assignee: J.P.Morgan Chase Bank, N.A. New York, NY (US) --

Signed and Sealed this

Eighth Day of April, 2008

JON W. DUDAS
*Director of the United States Patent and Trademark Office*